(12) United States Patent
Borgyos

(10) Patent No.: US 11,928,972 B2
(45) Date of Patent: Mar. 12, 2024

(54) SYSTEMS AND METHODS FOR A DYNAMIC RE-ROUTE INTERFACE

(71) Applicant: GE Aviation Systems LLC, Grand Rapids, MI (US)

(72) Inventor: Szabolcs A. Borgyos, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 329 days.

(21) Appl. No.: 17/370,432

(22) Filed: Jul. 8, 2021

(65) Prior Publication Data

US 2023/0008742 A1   Jan. 12, 2023

(51) Int. Cl.
*G08G 5/00* (2006.01)
*G06Q 30/0283* (2023.01)

(52) U.S. Cl.
CPC ......... *G08G 5/006* (2013.01); *G06Q 30/0283* (2013.01); *G08G 5/0026* (2013.01); *G08G 5/0039* (2013.01); *G08G 5/0069* (2013.01)

(58) Field of Classification Search
CPC .... G08G 5/006; G08G 5/0026; G08G 5/0039; G08G 5/0069; G06Q 30/0283
USPC ....................................................... 701/120
See application file for complete search history.

(56) References Cited

U.S. PATENT DOCUMENTS

| | | |
|---|---|---|
| 6,501,392 B2 | 12/2002 | Gremmert et al. |
| 8,849,476 B2 | 9/2014 | Coulmeau |
| 9,171,473 B1 | 10/2015 | McNally et al. |
| 9,886,861 B2 | 2/2018 | Shamasundar et al. |
| 10,068,488 B2 | 9/2018 | Ramaker et al. |
| 10,319,242 B2 | 6/2019 | Sindlinger et al. |
| 2006/0010037 A1* | 1/2006 | Angert ............... G06Q 30/0601 705/15 |
| 2014/0081569 A1* | 3/2014 | Agrawal ............. G08G 5/0091 701/467 |
| 2014/0257682 A1 | 9/2014 | Agarwal et al. |
| 2016/0180718 A1* | 6/2016 | Shapiro ................ G08G 5/0091 701/418 |
| 2019/0114931 A1 | 4/2019 | De Villele et al. |
| 2019/0320113 A1* | 10/2019 | Rajvanshi ............. H04N 23/64 |
| 2020/0105146 A1* | 4/2020 | Schwartz ............. G08G 5/0078 |

(Continued)

FOREIGN PATENT DOCUMENTS

| | | |
|---|---|---|
| EP | 3101393 A1 | 12/2016 |
| FR | 3055958 A1 | 3/2018 |

OTHER PUBLICATIONS

Extended European Search Report for Application No. 22179993.5 dated Nov. 18, 2022 (12 pages).

*Primary Examiner* — Isaac G Smith
(74) *Attorney, Agent, or Firm* — Dinsmore & Shohl LLP

(57) ABSTRACT

A method may include detecting, during a flight of an aircraft system, a conflict with a planned route of the aircraft system, determining one or more alternate routes for the aircraft system to avoid the conflict, wherein each of the one or more alternate routes avoid secondary conflicts with active flight operations, transmitting first data to cause first visual information indicating the conflict and second visual information indicating the one or more alternate routes to be displayed to a user, receiving second data indicating one of the one or more alternate routes being selected by the user, and updating the planned route of the aircraft system to include the alternate route selected by the user.

19 Claims, 12 Drawing Sheets

(56) References Cited

U.S. PATENT DOCUMENTS

| | | | |
|---|---|---|---|
| 2021/0097870 A1* | 4/2021 | Nakadai | G06Q 50/14 |
| 2021/0390867 A1* | 12/2021 | Kim | G08G 5/006 |
| 2023/0015165 A1* | 1/2023 | Martin | G08G 5/045 |

* cited by examiner

SYSTEMS AND METHODS FOR A DYNAMIC RE-ROUTE INTERFACE

FIELD

The present disclosure relates to monitoring of aerial vehicles, and more specifically, to systems and methods for a dynamic re-route interface.

BACKGROUND

Manned aircraft systems are governed by a multilayer model for conflict avoidance developed by the International Civil Aviation Organization (ICAO). This model is designed to ensure the safety of aircraft and avoid collisions. A first layer is strategic separation. This involves ensuring that no two aircraft have flight plans that overlap or use the same airspace. If the strategic separation layer fails, a second layer is tactical separation. This layer involves monitoring aircraft flights and ensuring that aircraft remain sufficiently far apart from each other to avoid collisions. This is typically done by an air traffic control system and air traffic controllers. If an air traffic controller observes two aircraft approaching each other at too close of a distance, the air traffic controller may instruct one or both of the aircrafts to modify their trajectory. Lastly, if strategic separation and tactical separation both fail, a third layer is collision avoidance. This layer involves pilots engaging in maneuvers to avoid collisions with other aircraft. An aircraft may have specialized equipment onboard to assist in collision avoidance.

Unmanned aerial vehicles, or drones, are increasingly being flown either for commercial or other purposes. As such, as more and more drones are operated, the potential for collisions between drones is increasing. Thus, a conflict avoidance system for drones may be desirable. Unmanned traffic management systems have been developed to manage unmanned aerial vehicle traffic. Some of these systems establish flight plans for drones that are free of conflicts. However, during a drone flight, one or more conflicts may pop up that were not previously known. As such, a new flight plan may need to be determined to re-route the drone around the conflict. This new flight plan may need to be determined in real-time during a flight. As such, there may not be sufficient time for a human operator of the drone to manually re-route the vehicle. Therefore, there is a need for a dynamic re-route interface to assist a human operator in selecting a new flight plan that is strategically deconflicted from other users of the airspace.

SUMMARY

In an embodiment, a method may include detecting, during a flight of an aircraft system, a conflict with a planned route of the aircraft system, determining one or more alternate routes for the aircraft system to avoid the conflict, transmitting first data to cause first visual information indicating the conflict and second visual information indicating the one or more alternate routes to be displayed to a user, receiving second data indicating one of the one or more alternate routes being selected by the user, and updating the planned route of the aircraft system to include the alternate route selected by the user. Each of the one or more alternate routes may avoid secondary conflicts with active flight operations.

In another embodiment, a dynamic re-routing unit may include one or more processors, one or more memory modules, and machine readable instructions stored in the one or more memory modules. When executed by the one or more processors, the instructions may cause the dynamic re-routing unit to detect, during a flight of an aircraft system, a conflict with a planned route of the aircraft system, determine one or more alternate routes for the aircraft system to avoid the conflict, transmit first data to cause first visual information indicating the conflict and second visual information indicating the one or more alternate routes to be displayed to a user, receive second data indicating one of the one or more alternate routes being selected by the user, and update the planned route of the aircraft system to include the alternate route selected by the user. The one or more alternate routes may avoid secondary conflicts.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
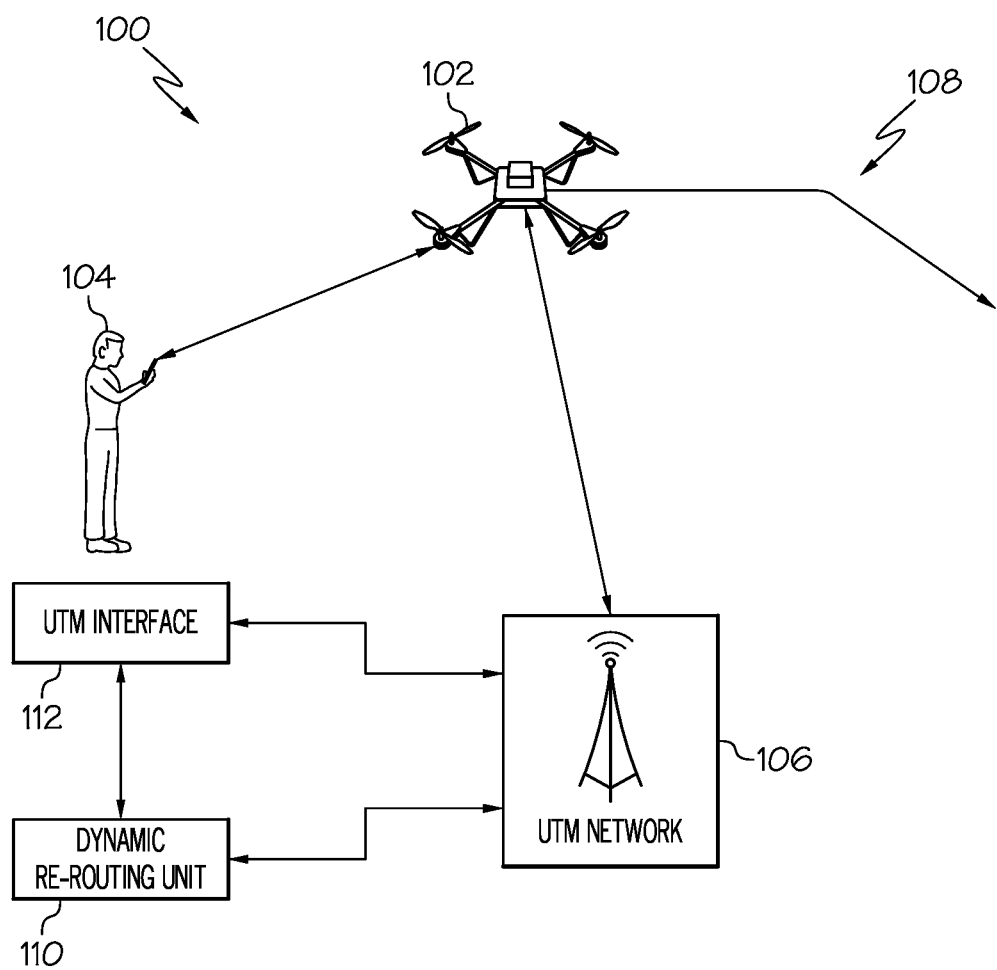
FIG. 1 schematically depicts an exemplary system for performing dynamic re-routing of unmanned aerial vehicles, according to one or more embodiments shown and described herein.

The present disclosure generally relates to an interface and decision support tool that is part of a conflict avoidance system for unmanned aircraft systems (UAS). UAS may also be referred to as unmanned aerial vehicles (UAV) or drones. While the examples disclosed herein are directed to an interface and decision support tool that is part of a conflict avoidance system for unmanned aircraft systems, it should be understood that in other examples, the disclosed interface and decision support tool may be used as part of a conflict avoidance system for manned aircraft systems.

A UAS may be monitored by one or more UAS service suppliers (USS). Multiple USS may comprise an unmanned traffic management (UTM) network, wherein each USS manages UAS traffic within a certain geographic area and/or for a certain set of clients. Thus, during a flight, a UAS may be monitored by multiple USS if the UAS travels between different zones of coverage.

Before a UAS begins a flight, a flight plan may be scheduled within a UTM network via a user interfacing with a USS. The USS may ensure that the flight plan does not conflict with any flight plans for other UAS scheduled to operate within the UTM network. Further, the USS within the UTM network may also ensure that the flight plan does not conflict with any known flight plans of manned aircraft or other potential conflicts (e.g., known aircraft restriction zones). Once a conflict-free flight plan is approved, the UAS may begin a flight following a route specified in the flight plan.

However, during the flight, conflicts may occur along the route of the flight plan that were not previously known. For example, other UAS or manned aircraft may be detected along the route, dangerous weather may develop, or certain authorities (e.g., local police, the FAA) may establish an aircraft exclusion zone along the route where aircraft are not allowed to fly. If such a conflict occurs during a flight, certain actions may be taken by the UAS to avoid the conflict. If the conflict is very close to the UAS, it may be necessary for the UAS operator or the UAS itself (e.g., using autonomous flight controls) to take evasive action to avoid the conflict. However, this may be dangerous for the UAS and it may be desirable to dynamically determine a new strategically deconflicted flight plan for the UAS to re-route around the conflict before it becomes necessary to take such evasive action.

While it may be possible for a human operator of a UAS to manually re-route the UAS around a conflict, the human operator may not be able to determine the most desirable way to re-route the UAS around the conflict or may lack the time to determine a new conflict-free route. In addition, if a human operator manually re-routes a UAS around a conflict, the UAS may encounter secondary conflicts (e.g., a conflict based on a new route of the UAS), potentially requiring further evasive action such as collision avoidance. Thus, it may be desirable for the UTM network monitoring the UAS or a dynamic re-routing unit to determine a new flight plan to re-route the UAS around detected conflicts.

Furthermore, there may be multiple ways to re-route a UAS around a conflict, with each potential re-route having different costs and/or benefits. For example, one route may be safer than other routes, one route may be faster than other routes, and another route may have a lower fuel cost than other routes. Accordingly, a dynamic re-routing unit may identify different re-routing options to avoid a conflict and may present the different options to a UAS operator. The UAS operator may then select re-routing options based on the particular preferences of the UAS operator.

As disclosed herein, a UTM network may identify a conflict with a scheduled UAS flight plan during a UAS flight. A dynamic re-routing unit may then dynamically determine one or more alternate routes to avoid the conflict, while also avoiding secondary conflicts. Each determined alternate route may have different benefits (e.g., minimizing risk, minimizing travel time, and the like). Each determined alternate route may be presented to the UAS operator. The UAS operator may then select a preferred route and may cause the UAS to follow the selected route.

In some examples, the dynamic re-routing unit may monitor alternate routes selected by a UAS operator over time in several situations involving conflicts that occur during UAS flights. Based on the past selections of the UAS operator, the dynamic re-routing unit may determine that the UAS operator generally selects a particular type of route (e.g., the route that minimizes fuel cost or the route that minimizes travel time). After determining that a particular user generally prefers a particular route, the dynamic re-routing unit may cause that type of route to be preferentially displayed such that the user may easily select that route (e.g., with a single click). The other routes may still be presented to the user without being preferentially displayed (e.g., a user may select one of the other routes with several clicks).

FIG. 1 depicts an example system 100 for providing conflict avoidance for UAS. In the example of FIG. 1, a UAS 102 is flown in a certain airspace along a route 108. The UAS 102 may be controlled remotely by a UAS operator 104. The UAS operator 104 may communicate with the UAS operator 104 via a command and control link (e.g., satellite, radio, cellular, or the like). The UAS operator 104 may transmit commands to control the movement and operation of the UAS 102 and the UAS 102 may transmit commands back to the UAS operator 104 (e.g., telemetry data or other types of data). In some examples, the UAS 102 may operate partially or completely autonomously.

A UTM network 106 may manage air traffic involving the UAS 102 and other UAS. The UTM network 106 may comprise one or more USS. A USS may manage UAS traffic within a certain geographic area and/or for a certain set of clients. A USS may monitor UAS with either ground based radar tracking and/or by receiving telemetry directly from UAS that identify their position. In addition to tracking the position of UAS, a USS may communicate with UAS operators to provide instructions to guide UAS along certain routes to avoid collision with other UAS and to otherwise manage airspace, as disclosed herein. In embodiments, the route 108 along which the UAS 102 is traveling may be included in a flight plan scheduled with the UTM network 106.

In some examples, the USS of the UTM network 106 may communicate with the UAS operator 104 via a UTM interface 112. In embodiments, the UTM interface 112 may display data received from the UTM network 106 and may be used by the UAS operator 104 to input information that may be sent to the UTM network 106. In some embodiments, the UTM interface 112 may also be used to communicate with a dynamic re-routing unit 110, as disclosed in further detail below. In some examples, the UTM interface 112 may comprise a standalone computing device with a keyboard or other input and a display screen. In other examples, the UTM interface 112 may be included in a smartphone application or other mobile device.

While a single USS may cover a certain geographic area, a plurality of USS may be part of the UTM network 106 to manage air traffic over a larger geographic area. Different USS that are part of the UTM network 106 may communicate with each other to jointly manage UAS air traffic (e.g., one USS may monitor a particular UAS and hand off control to another USS as the USS is leaving its airspace). Because USS are currently less regulated than air traffic control systems for manned aircraft, UAS operators typically sign up for service with the USS of their choice. As such, multiple USS may provide service to clients in overlapping geographic areas, in which case they may communicate with each other to jointly ensure aircraft separation.

Each USS of the UTM network 106 may monitor one or more UAS operated by one of the clients of the USS either using ground-based tracking (e.g., radar) or by receiving telemetry information from the UAS themselves. A USS may send commands to the operators of the UAS being monitored to ensure that UAS do not collide with each other and to provide other air traffic control features. In some examples, a USS may send commands directly to UAS to modify their operation (e.g., changing their flight path). In addition, multiple USS in the UTM network 106 may communicate with each other to ensure that UAS being monitored by different USS do not collide with each other. USS may also receive supplemental data from other service provides (e.g., information regarding weather, terrain, and the like) and may provide this information to the USS clients.

Figure 2:
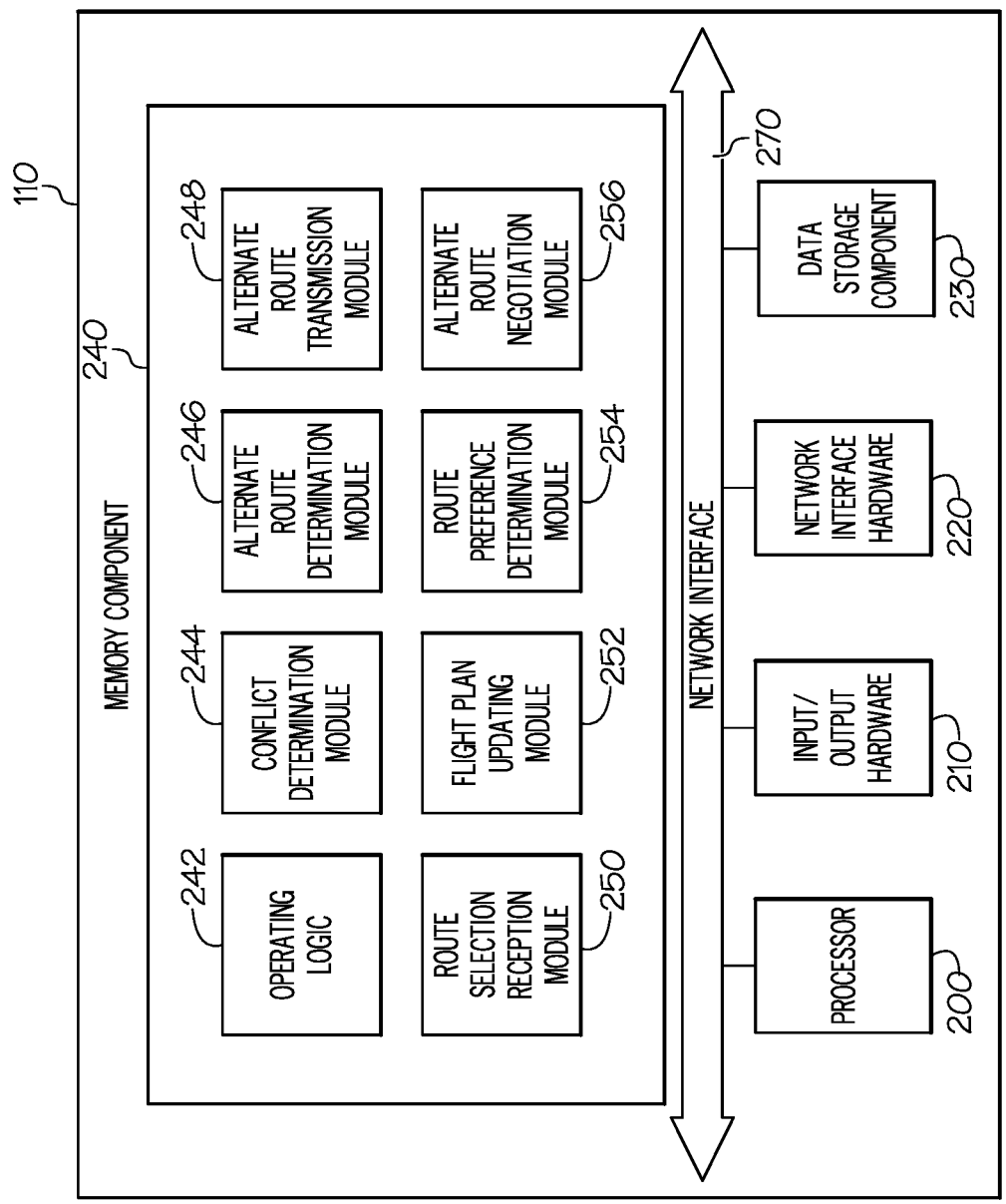
FIG. 2 schematically depicts an example dynamic re-routing unit, according to one or more embodiments shown and described herein.

A dynamic re-routing unit 110 may dynamically re-route a UAS during a flight operation as described herein. In some examples, the dynamic re-routing unit 110 may be a cloud-based server computing device. In other examples, the dynamic re-routing unit 110 may be any type of computing device (e.g., mobile computing device, personal computer, etc.). Additionally, while the dynamic re-routing unit 110 is depicted in FIGS. 1-2 as a single piece of hardware, this is merely an example. In some examples, the dynamic re-routing unit 110 may represent a plurality of computers, servers, databases, etc. In some examples, the dynamic re-routing unit 110 may be configured as a collection of cooperating computing devices or even as a special purpose computer designed specifically for performing the functionality described herein.

Now referring to FIG. 2, the components of the dynamic re-routing unit 110 are schematically depicted. As illustrated in FIG. 2, the dynamic re-routing unit 110 may include a processor 200, input/output hardware 210, network interface hardware 220, a data storage component 230, and a non-transitory memory component 240. The memory component 240 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242, a conflict determination module 244, an alternate route determination module 246, an alternate route transmission module 248, a route selection reception module 250, a flight plan updating module 252, a route preference determination module 254, and an alternate route negotiation module 256 (each of which may be embodied as a computer program, firmware, or hardware, as an example). A network interface 270 is also included in FIG. 2 and may be implemented as a bus or other interface to facilitate communication among the components of the dynamic re-routing unit 110.

The processor 200 may include any processing component configured to receive and execute instructions (such as from the data storage component 230 and/or the memory component 240). The input/output hardware 210 may include a monitor, keyboard, mouse, printer, camera, microphone, speaker, touch-screen, and/or other device for receiving from, and sending data to the dynamic re-routing unit 110. The network interface hardware 220 may include any wired or wireless networking hardware, such as a modem, LAN port, wireless fidelity (Wi-Fi) card, WiMax card, mobile communications hardware, and/or other hardware for communicating with the UTM network 106, the UTM interface 112, and other networks and/or devices.

The data storage component 230 may store information received from the UTM interface 112 and/or the UTM network 106. The data received from these devices or systems is discussed in further detail below.

Included in the memory component 240 are operating logic 242, the conflict determination module 244, the alternate route determination module 246, the alternate route transmission module 248, the route selection reception module 250, the flight plan updating module 252, the route preference determination module 254, and the alternate route negotiation module 256. The operating logic 242 may include an operating system and/or other software for managing components of the dynamic re-routing unit 110.

The conflict determination module 244 may determine when there is a conflict with a flight plan of the UAS 102 during a flight of the UAS 102. A conflict with the flight plan of the UAS 102 may occur for a variety of reasons. In one example, another aircraft may be detected that is expected to intersect with the planned route of the UAS 102. In another example, dangerous weather may be detected along the planned route of the UAS 102. In another example, a portion of the planned route of the UAS 102 may become restricted. For example, the FAA, a local police department, or some other government agency may establish an airspace restriction zone where the UAS 102 is not allowed to fly.

A conflict may be detected by the UTM network 106 using radar or other sensors. When a conflict is detected by the UTM network 106, the UTM network 106 may transmit information about the conflict to the dynamic re-routing unit 110. The information about the conflict may be received by the conflict determination module 244. The information about the conflict may include at least the location of the conflict and the time of the conflict.

Figure 5:
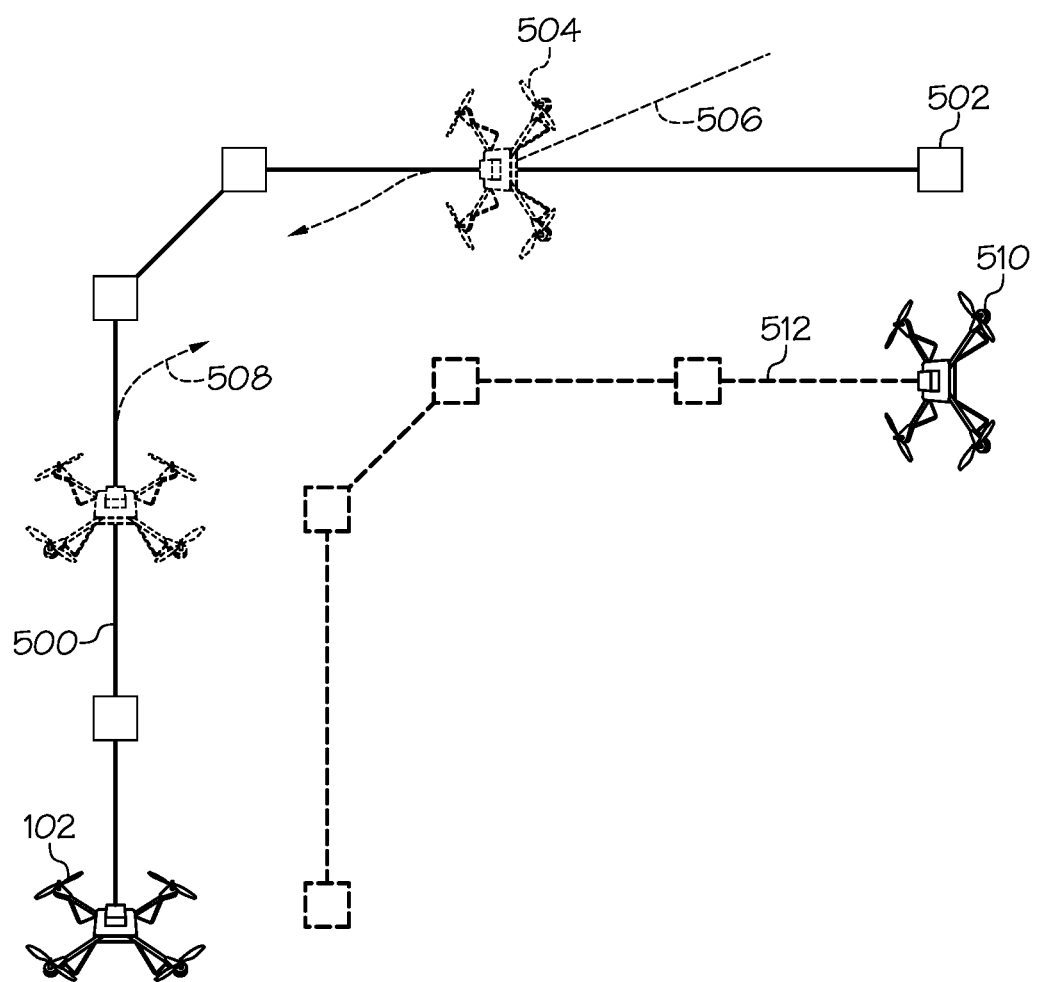
FIG. 5 depicts an example of a conflict situation that may occur involving unmanned aerial vehicles.

FIG. 5 shows an example of a conflict that may occur with another aircraft. In the example of FIG. 5, the UAS 102 is flying along a route 500 towards a destination 502. During the flight, the UTM network 106 may detect aircraft 504 traveling along route 506. As shown in FIG. 5, this expected route 506 of the aircraft 504 will intersect with the route 500 of the UAS 102. As such, the UTM network 106 may identify this conflict and transmit information about the conflict to the dynamic re-routing unit 110.

When a conflict is determined in real-time during a flight, there may be minimal time to re-route the UAS 102 in order to avoid the conflict and prevent a collision. As such, it may be difficult for the UAS operator 104 to manually determine a new route for the UAS 102. Furthermore, if the UAS operator 104 manually re-routes the vehicle, secondary conflicts may be created. For example, if the UAS operator 104 causes the UAS 102 to follow alternate route 508, a secondary conflict may be created with aircraft 510 following route 512.

If no alternative route is identified, the UAS 102 and/or the UAS operator 104 may need to invoke an airborne collision avoidance system (ACAS) or traffic collision avoidance system (TCAS) of the UAS 102. Such tactical solutions are the last resort and are not the optimal solution to avoid a conflict. Thus, it may be preferable for the dynamic re-routing unit 110 to determine an alternate route to avoid a conflict before ACAS/TCAS are needed.

Referring back to FIG. 2, the alternate route determination module 246 may determine one or more alternate routes for the UAS 102 to follow to avoid a detected conflict. The alternate route determination module 246 may determine one or more alternate routes in real-time during the flight of the UAS 102. In particular, the alternate route determination module 246 may determine one or more alternate routes for the UAS based on the current position of the UAS 102 and the destination of the UAS 102. That is, the alternate route determination module 246 may determine one or more ways to re-route the UAS 102 to its destination. In particular, the alternate route determination module 246 may determine one or more alternate routes that avoid secondary conflicts. In embodiments, the dynamic re-routing unit 110 may be aware of other UAS flight plans and/or other potential conflicts (e.g., conflicts detected by the UTM network 106) and may avoid selecting alternate routes that conflict with other flight plans and/or other conflicts.

In embodiments, the alternate route determination module 246 may determine a plurality of alternate routes, wherein each alternate route maximizes or minimizes a particular metric. For example, alternate routes may be determined that minimize travel time, minimize risk, minimize fuel cost, minimize distance, or minimize schedule disruption (e.g., cause the UAS 102 to arrive at its destination as close as possible to its originally scheduled arrival time). In some examples, the alternate route determination module 246 may determine an alternate route that considers multiple factors and determines a route that balances competing factors. In some examples, different factors may be weighted according to user preferences when determining such an alternate route.

Figure 6:
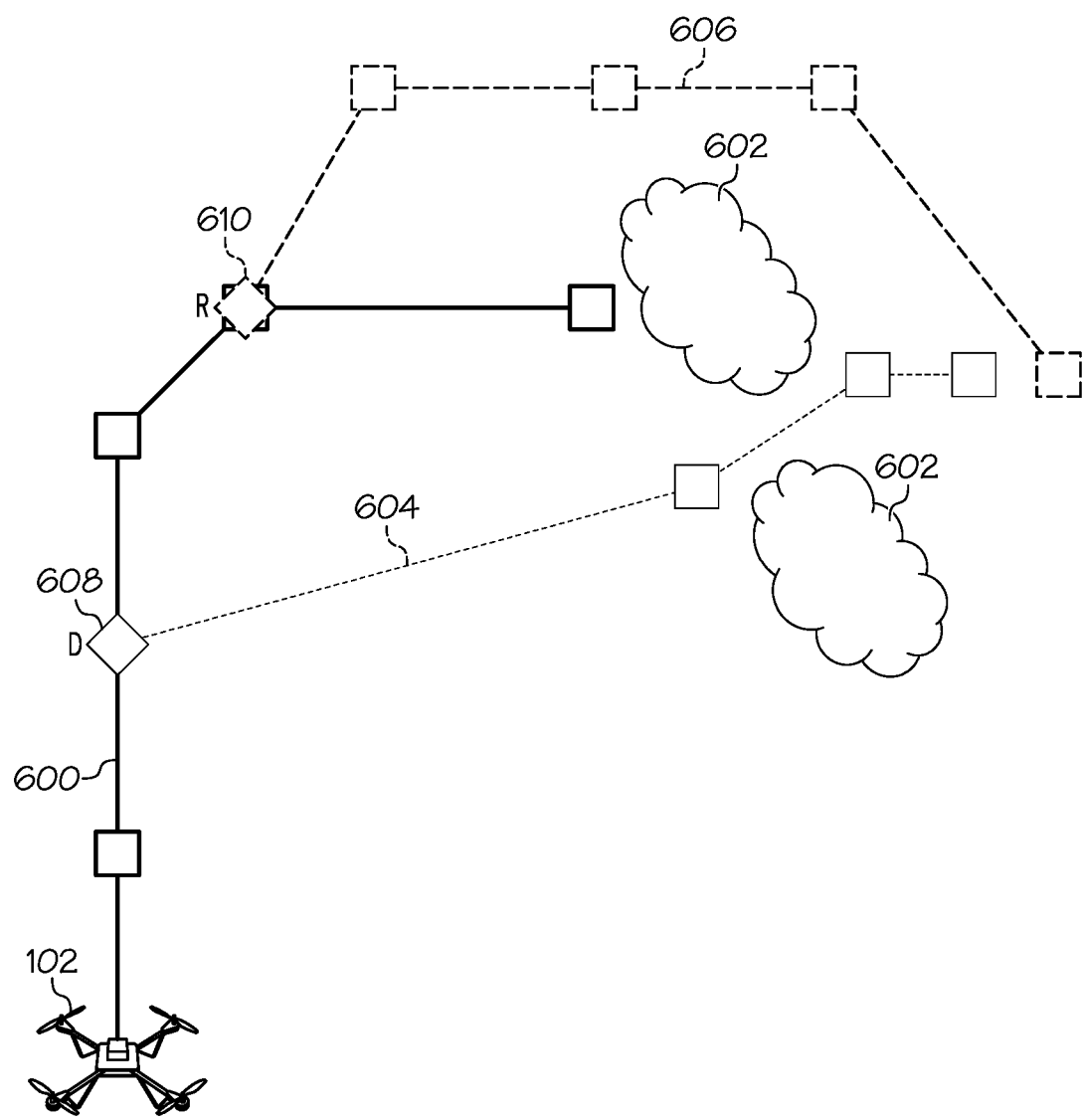
FIG. 6 depicts an example re-routing of an unmanned aerial vehicle, according to one or more embodiments shown and described herein.

FIG. 6 shows an example of alternate routes that may be determined by the alternate route determination module 246. In the example of FIG. 6, the UAS 102 is flying along route 600 when a weather system 602 is detected along a portion of the route 600 that the UAS 102 is unable to fly through, thereby creating a conflict. In the example of FIG. 6, the alternate route determination module 246 determines two alternate routes 604 and 606. Route 604 is an alternate route that minimizes the distance traveled. However, route 604 has a higher risk since it requires flying through a break in the weather system 602 that may shrink or disappear if the weather changes. Alternatively, route 606 minimizes risk since it goes around the weather system 602 completely. However, route 606 requires the UAS 102 to travel a greater distance.

In addition to determining alternate routes, the alternate route determination module 246 may also determine a time period before an alternate route would begin (e.g., a time period before an alternate route would break away from a planned route). This time period may be determined based on the current position of the UAS 102, the originally planned route, the alternate route, and the speed of the UAS 102. The determined time period to begin each alternate route may be used as described in further detail below.

Referring back to FIG. 2, the alternate route transmission module 248 may transmit the alternate routes determined by the alternate route determination module 246 to the UTM interface 112. Specifically, the alternate route transmission module 248 may transmit information including where each alternate route starts (e.g., where an alternate route deviates from a planned route) and the path of each alternate route. For example, as shown in FIG. 6, alternate route 604 breaks away from the originally planned route 600 at point 608 and alternate route 606 breaks away from the originally planned route 600 at point 610.

In addition to transmitting route information for alternate routes determined by the alternate route determination module 246, the alternate route transmission module 248 may also transmit the time periods before each alternate route begins, as determined by the alternate route determination module 246. The alternate route determination module 246 may also determine a time horizon by which an alternate route may be selected before collision avoidance must be implemented. This time horizon information may be used by the UTM interface 112, as disclosed herein.

Figure 7:
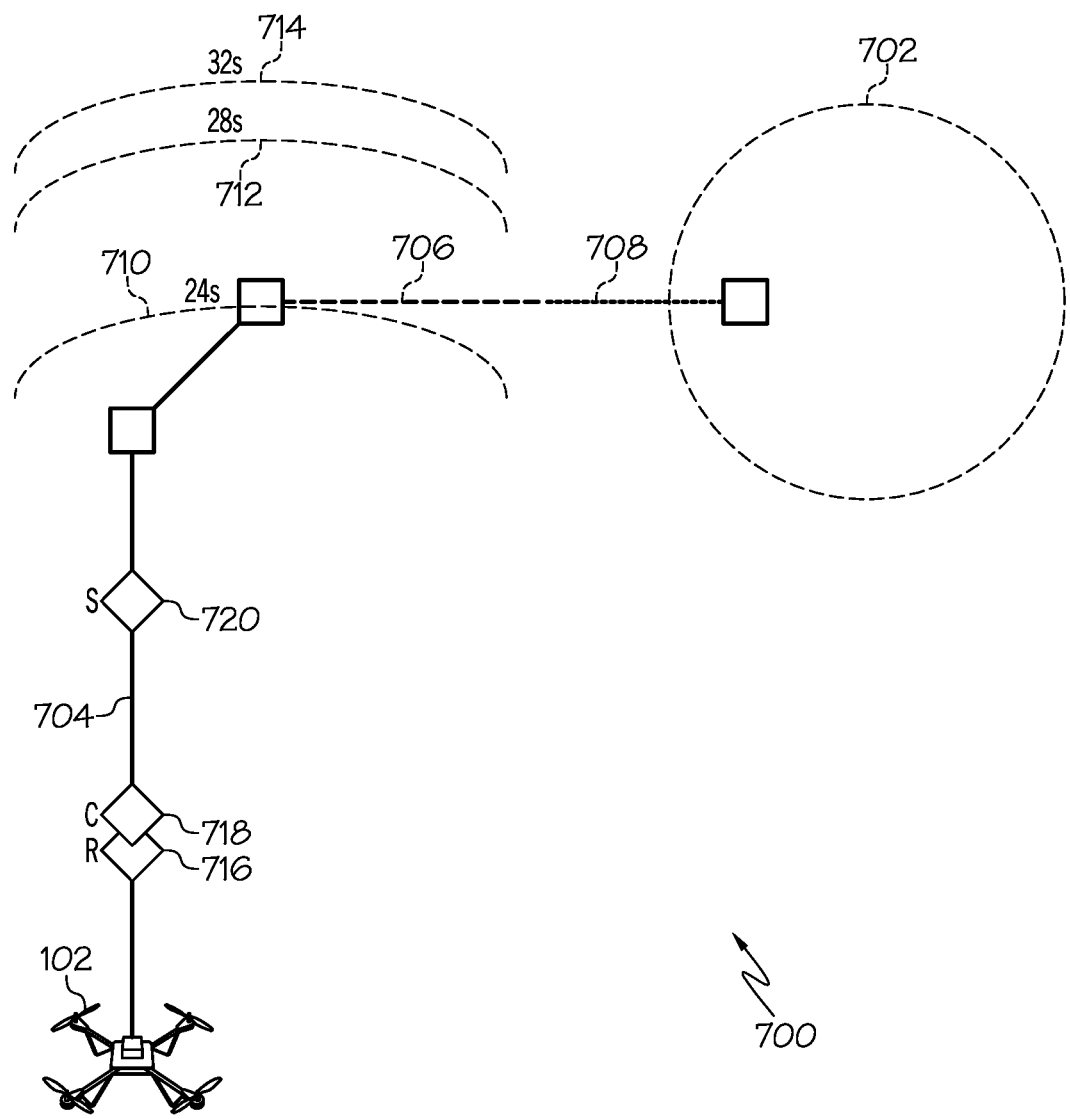
FIG. 7 depicts an example display of a dynamic re-route interface, according to one or more embodiments shown and described herein.

After the UTM interface 112 receives the information regarding alternate routes from the alternate route transmission module 248, the UTM interface 112 may display information regarding the alternate routes, as disclosed herein. FIG. 7 shows an example image that may be displayed by the UTM interface 112. In the example of FIG. 7, the UAS 102 is traveling along route 700. As such, a representation of the UAS 102 is shown along with the path of the route 700.

In the example of FIG. 7, the conflict determination module 244 determines an unmanned volume restriction (UVR) 702, which creates a conflict. Thus, the UTM interface 112 may display an image of the conflict, thereby notifying the UAS operator 104 of the conflict. In the example of FIG. 7, the conflict comprises the UVR 702 where the UAS 102 is not allowed to fly. However, in other examples, any detected conflict may be displayed by the UTM interface 112.

The UTM interface 112 may display different portions of a planned route differently (e.g., in different colors) based on a danger level with respect to a detected conflict. For example, in the example of FIG. 7, a first segment 704 of the route 700 may be shown in yellow, a second segment 706 of the route 700 may be shown in orange, and a third segment 708 of the route 700 may be shown in red. The first segment 704 of the route 700 may comprise a segment of the route 700 during which the UAS 102 still has time to safely select an alternate route to avoid the conflict 702. The second segment 706 of the route 700 may comprise a segment of the route 700 during which it is more dangerous for the UAS 102 to select an alternate route. The third segment 708 of the route 700 may comprise a segment of the route 700 where it is too late for the UAV to follow an alternate route and conflict avoidance must be implemented to avoid the conflict 702.

In addition to displaying the different segments of a route, the UTM interface 112 may display time horizons to each of the segments of the route. For example, in the example of FIG. 7, the UTM interface 112 may display a first indicator 710 indicating that the UAS 102 will remain within the first segment 704 of the route 700 for 24 seconds. The UTM interface 112 may display a second indicator 712 indicating that the UAS 102 will remain within the second segment 706 of the route 700 for 28 seconds. The UTM interface 112 may display a third indicator 714 indicating that the UAS 102 will remain within the third segment 708 of the route 700 for 32 seconds. As the UAS 102 continues along the route 700, the UTM interface 112 may change the display to update the position of the UAS 102 and to update the indicators 710, 712, 714.

The indicators 710, 712, 714 may be color coated or otherwise displayed so as to match the segments 704, 706, 708. For example, the indicator 710 and the segment 704 may both be coated yellow, the indicator 712 and the segment 706 may both be coated orange, and the indicator 714 and the segment 708 may both be coated red. By displaying the different sections of the route 700 as well as the time horizons to the different sections, the UTM interface 112 may quickly present a picture to the UAS operator 104 of how long they have to make a decision regarding alternate routes.

The UTM interface 112 may also display positions along the route 700 where the various alternate routes determined by the alternate route determination module 246 begin. In the example of FIG. 7, three diamonds 716, 718, 720 are shown along the route 700 adjacent to the letters 'S', 'C' and 'R'. These diamonds represent positions along the route 700 where three different alternate routes determined by the alternate route determination module 246 begin. In other examples, the UTM interface 112 may use other methods to display where alternate routes begin.

In the example of FIG. 7, diamond 716 represents the starting point of an alternate route that is optimized to minimize risk. For example, this alternate route may avoid flying over large areas of population. The diamond 718 represents the starting point of an alternate route that is optimized to minimize cost (e.g., fuel cost). The diamond 720 represents the starting point of an alternate route that is optimized for schedule (e.g., to arrive at the destination as close to the originally scheduled arrival time as possible).

In the example of FIG. 7, the UTM interface 112 only shows the starting locations of the determined alternate routes and does not show the complete details of the alternate routes. This is done so as not to unnecessarily clutter the display. However, in some examples, the UTM interface 112 may display the complete alternate routes.

As the UAS 102 continues to fly along its originally scheduled route without an alternate route being selected, the UAS 102 may pass the starting points of the determined alternate routes. When the UAS 102 passes a starting point of a determined alternate route, the alternate route determination module 246 of the dynamic re-routing unit 110 may recalculate a new starting point for that alternate route if possible. For example, in the example of FIG. 7, if the UAS 102 passes point 716 (the starting point of the lowest risk alternate route), the alternate route determination module 246 may determine a new alternate route with a later starting point that is optimized to minimize risk. The UTM interface 112 may then display this newly determined alternate route starting point. As the UAS 102 continues along the route 700, the alternate route determination module 246 may continually determine new alternate routes with new starting points optimized for different criteria and the UTM interface 112 may continue to display the new starting points.

Figure 8:
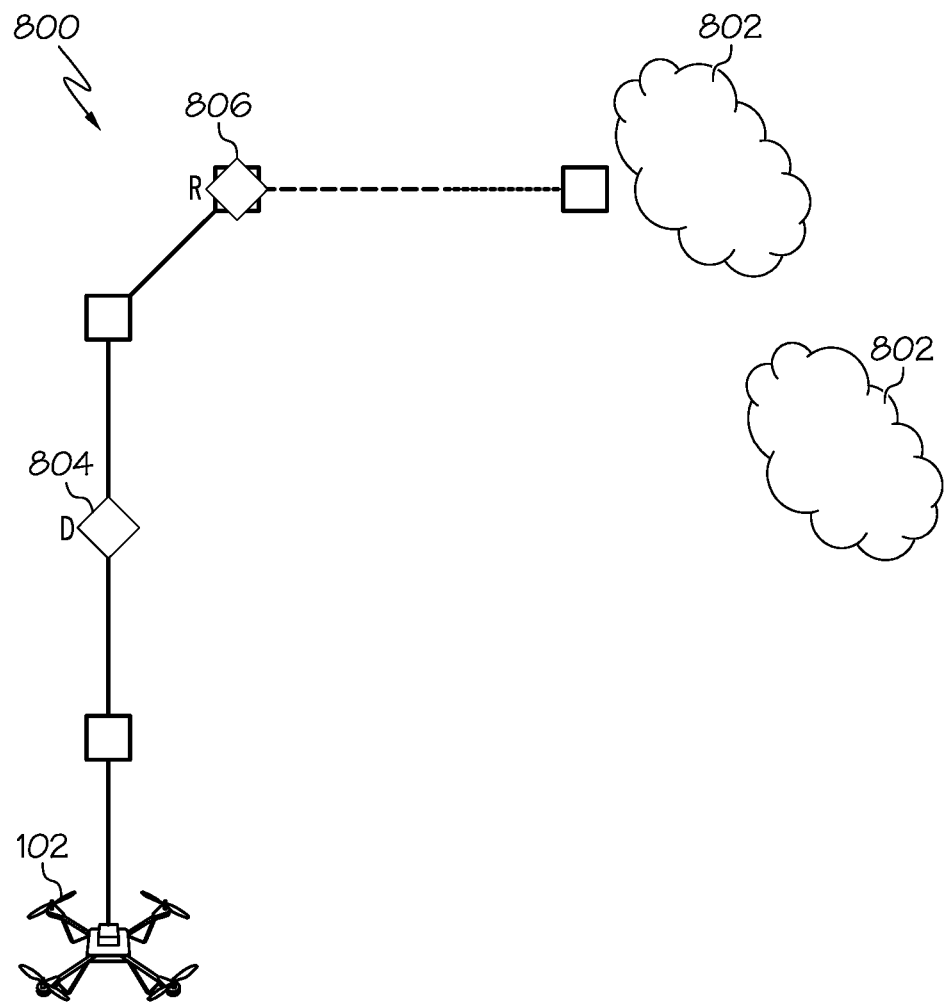
FIG. 8 depicts another example display of a dynamic re-route interface, according to one or more embodiments shown and described herein.

Referring back to FIG. 2, the route selection reception module 250 may receive data from the UTM interface 112 indicating that the UAS operator 104 has accepted one of the alternate routes transmitted by the alternate route transmission module 248. More specifically, after the UTM interface 112 displays the starting points for the determined alternate routes, the UAS operator 104 may select one of the alternate routes (e.g., by clicking on the starting point for one of the alternate routes). Once the UAS operator 104 clicks on an alternate route starting point, the UTM interface 112 may display the full alternate route that the UAS operator 104 selected. For example, FIG. 8 shows an example where the UAS 102 is flying along route 800 when conflict 802 is detected. After the conflict 802 is detected, the alternate route determination module 246 determines two alternate routes. One of the determined alternate routes is optimized to minimize distance and the other alternate route is optimized to minimize risk. The alternate route that minimizes distance begins at a point 804 (as indicated by diamond 804) and the alternate route that minimizes risk begins at a point 806 (as indicated by diamond 806). Accordingly, in the example of FIG. 8, the UTM interface 112 displays diamonds 804 and 806.

Figure 9:
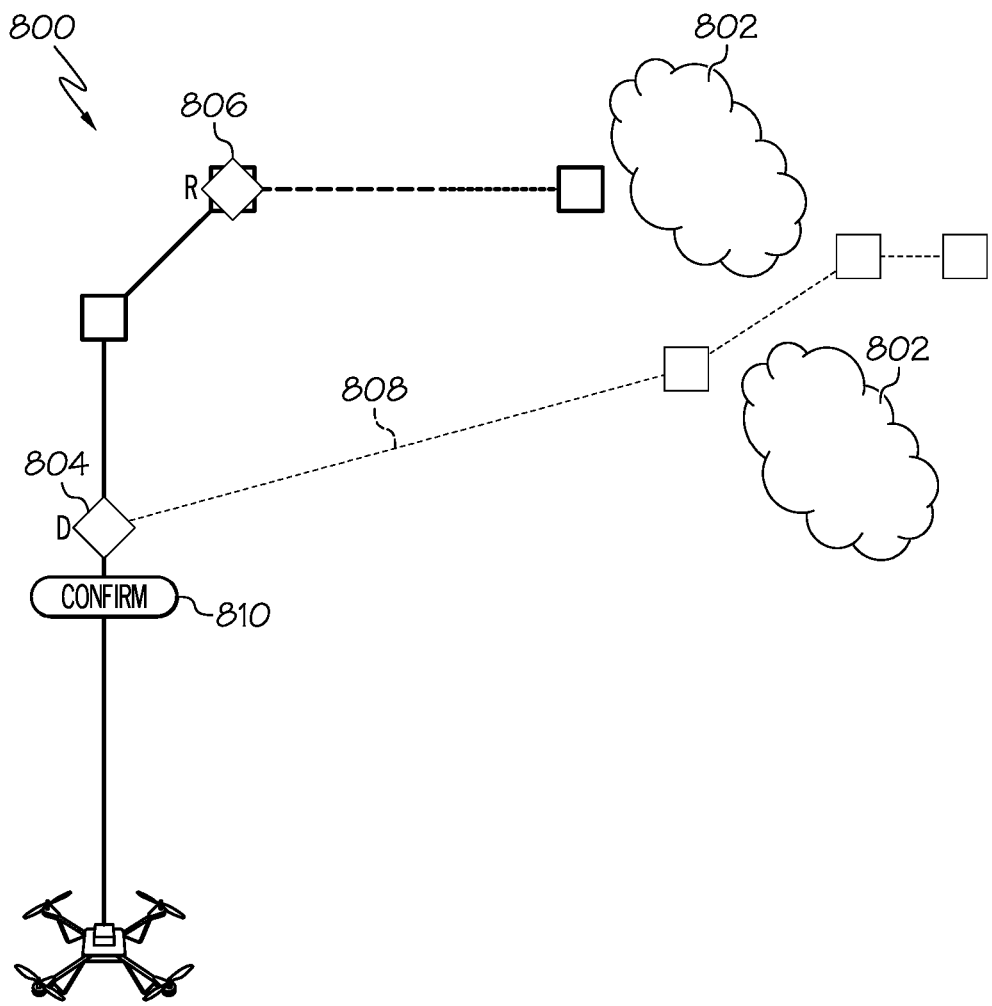
FIG. 9 depicts another example display of a dynamic re-route interface, according to one or more embodiments shown and described herein.

In the example of FIG. 8, if the UAS operator 104 clicks on the starting point 804, the UTM interface 112 may display the alternate route 808 that begins at the starting point 804, as shown in FIG. 9. The UTM interface 112 may also display confirmation icon 810, which the UAS operator 104 may click to confirm the selection of the alternate route 808. Alternatively, if the UAS operator changes their mind, the UAS operator 104 may click on diamond 806 and the alternate route beginning at the starting point 806 will be displayed. Once the UAS operator 104 confirms a selected alternate route, the UTM interface 112 may transmit the selected alternate route to the dynamic re-routing unit 110 and may be received by the route selection reception module 250.

Referring back to FIG. 2, the flight plan updating module 252 may update the flight plan with the UTM network 106 based on the alternate route selected by the UAS operator 104. Specifically, the dynamic re-routing unit 110 may transmit details about the selected alternate route to the UTM network 106. The UTM network 106 may then update the appropriate records to record the changed flight plan.

Referring back to FIG. 2, the route preference determination module 254 may determine a preferred alternate route for a user, as disclosed herein. As disclosed above, when a conflict occurs during a flight of the UAS 102, the dynamic re-routing unit 110 may determine a plurality of alternate routes, which the UTM interface 112 may display to the user. As disclosed above, each of the determined alternate routes may be optimized for a different feature (e.g., minimal fuel cost, minimal risk, etc.). Over time, a particular user (e.g., the UAS operator 104) may routinely select one type of alternate route more often than other types of alternate routes. For example, one user may generally select an alternate route that minimizes fuel cost while another user may generally select an alternate route that minimizes risk. A particular user may select a particular alternate route due to business reasons, personal preference, or other factors.

If a particular user routinely selects one of type of alternate route more often than others, it may be beneficial to preferentially display that type of alternate route to the user over other types of alternate routes. Accordingly, every time that a user (e.g., the UAS operator 104) selects a particular alternate route and the alternate route is transmitted from the UTM interface 112 to the dynamic re-routing unit 110, the dynamic re-routing unit 110 may store the route selected by the user in the data storage component 230. As such, over time, the dynamic re-routing unit 110 may build up a historical record of alternate routes selected by each user. Then, when a conflict occurs during a flight for a particular user, the route preference determination module 254 may access the records of previous alternate routes selected by the user in the data storage component 230 to determine whether a user often selects one type of alternate route. If so, the route preference determination module 254 may determine the identified type of alternate route as that user's preference.

If the route preference determination module 254 determines that the UAS operator 104 prefers one type of alternate route, then the alternate route transmission module 248 may transmit this preference information. In embodiments, when the alternate route transmission module 248 transmits route preference information, the UTM interface 112 may preferentially display the preferred alternate route. For example, if the UAS operator 104 prefers alternate routes that minimize distance, then the UTM interface 112 may display the image shown in FIG. 9, where the route 808 that is optimized for distance is selected. The UAS operator 104 may then click confirm to select the alternate route 808 with a single click. Alternatively, if the UAS operator 104 would like to select a different route (e.g., the route beginning at point 806 in FIG. 9), the UAS operator 104 may still select a different route by clicking on the starting point for another route and then clicking confirm. As such, the UAS operator 104 may select a route different from their usual preference by using two clicks.

Figure 10:
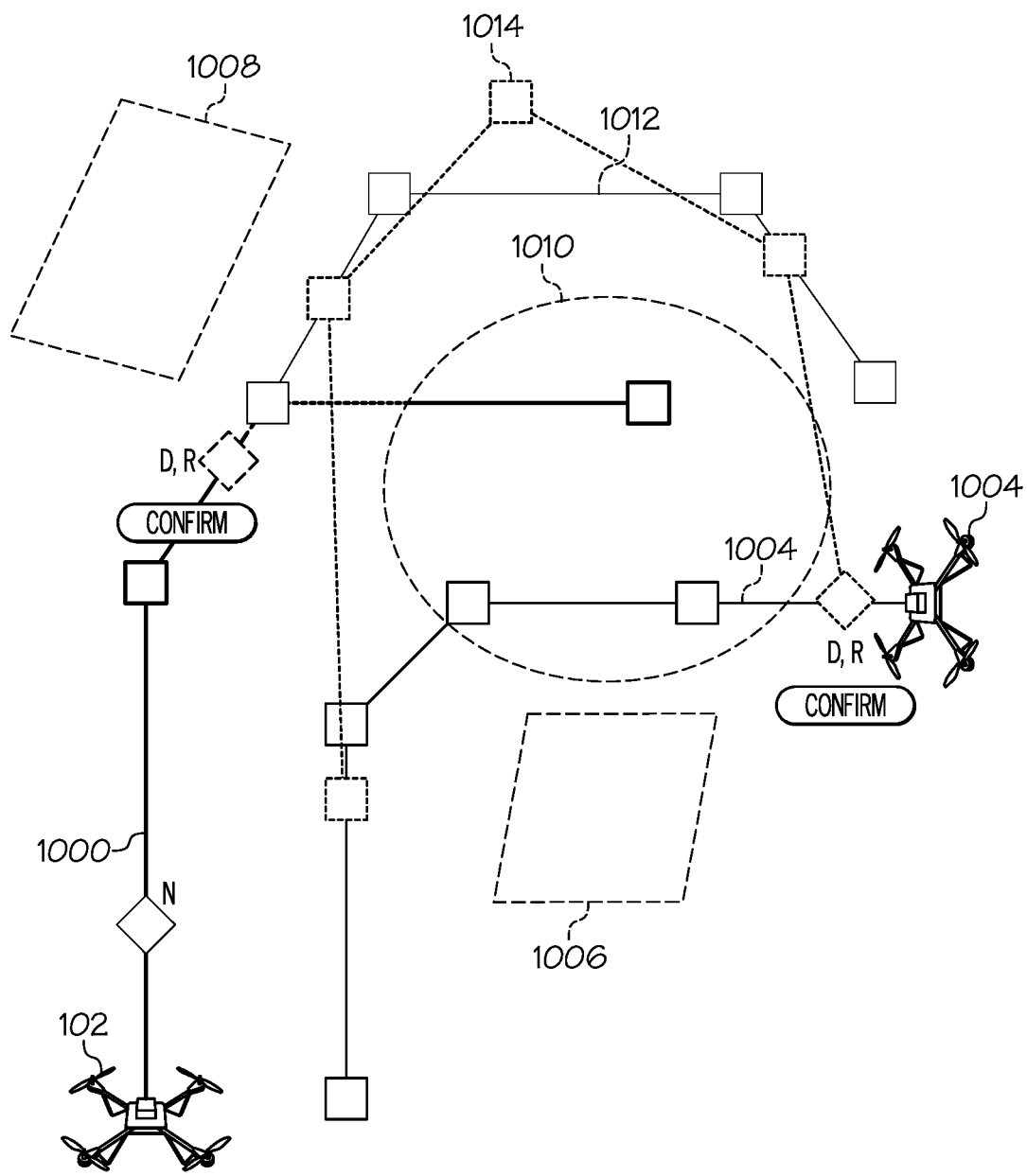
FIG. 10 depicts another example display of a dynamic re-route interface, according to one or more embodiments shown and described herein.

Referring back to FIG. 2, the alternate route negotiation module 256 may be used to negotiate alternate routes when a conflict affects multiple UAS. FIG. 10 shows an example of multiple UAS being affected by the same conflict. In the example of FIG. 10, the UAS 102 is flying along a route 1000 and another UAS 1002 is flying along a route 1004. In the example of FIG. 10, both UAS 102 and UAS 1002 are flying around terrain 1006 and 1008 and the routes 1000 and 1004 do not conflict with each other. However, a conflict 1010 pops up affecting both routes.

In the example of FIG. 10, the alternate route determination module 246 determines an alternate route 1012 for UAS 102 and an alternate route 1014 for UAS 1002. Routes 1012 and 1014 are optimized for distance and risk for the respective UAS 102 and 1002. Both routes 1012 and 1014 avoid the conflict 1010. However, if UAS 102 were to select the alternate route 1012 and UAS 1002 were to select the alternate route 1014, the two alternate routes would conflict with each other. As such, the alternate route negotiation module 256 may determine which UAS is able to use the selected alternate route.

In one example, the alternate route 1012 may be presented to the operator of UAS 102 and the alternate route 1014 may be presented to the operator of UAS 1002. Then, whichever UAS operator selects the alternate route first would be granted the route. For example, if the UAS operator 104 selects the alternate route 1012 before the operator of UAS 1002 selects the alternate route 1014, then the alternate route negotiation module 256 would cause the alternate route 1014 to be no longer presented to the operator of UAS 1002. As such, the operator of UAS 1002 would have to select a different alternate route or utilize collision avoidance.

Figure 11:
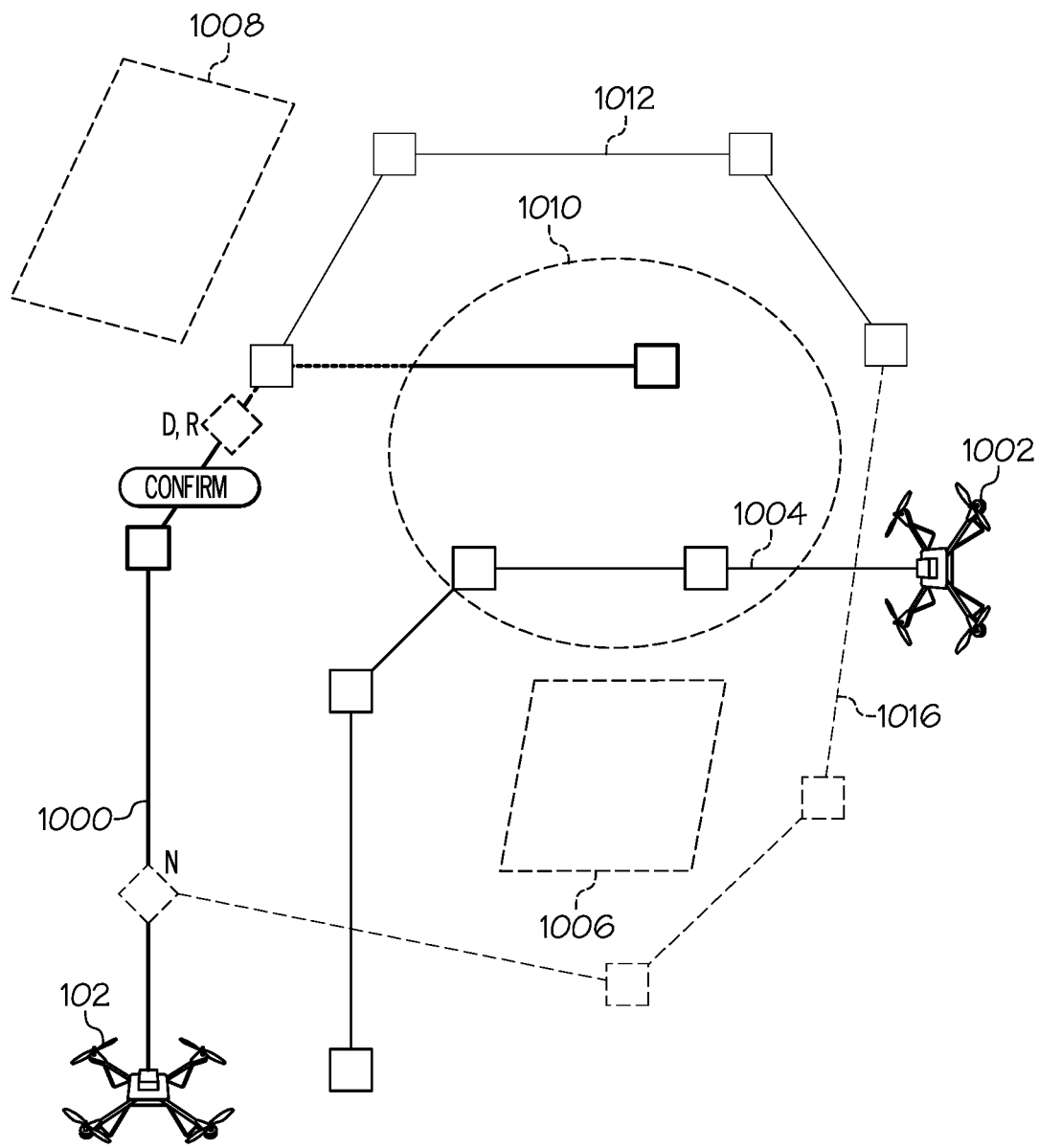
FIG. 11 depicts another example display of a dynamic re-route interface, according to one or more embodiments shown and described herein.

In some examples, when a conflict exists between alternate routes for two UAS, the alternate route negotiation module 256 may select one or more negotiated routes for one or more of the UAS involved in the conflict. For example, FIG. 11 shows an image that the UTM interface 112 may present to the UAS operator 104 in the situation described above with reference to FIG. 10. In the example of FIG. 11, the UTM interface 112 may display an alternate route 1012 that is optimized for distance and risk and the UTM interface 112 may also display a negotiated route 1016. The negotiated route may be determined by the alternate route negotiation module 256. The negotiated route may not be optimized for distance or risk but the route avoids a potential conflict with an alternate route that may be used by the UAS 1002. The alternate route negotiation module 256 may similar determine a negotiated route for the UAS 1002.

In some examples, if the UAS operator 104 selects the alternate route 1012 before the operator of the UAS 1002 selects an alternate route that conflicts with route 1012, then the UAS 102 may use alternate route 1012. However, if the operator of the UAS 1002 first selects an alternate route that conflicts with alternate route 1012, then the alternate route negotiation module 256 may cause the UTM interface 112 to remove alternate route 1012 from the display such that the UAS operator 104 may then only select the negotiated route 1016.

As described above, in one example, the alternate route negotiation module 256 may determine the use of potentially conflicting routes between different UAS by granting an alternate route on a first come, first served basis. However, in other examples, the alternate route negotiation module 256 may use a pricing mechanism to determine the use of potentially conflict routes between different UAS, as described below.

In some examples, when a conflict exists between determined alternate routes for two UAS (e.g., as shown in FIG. 10), the alternate route negotiation module 256 may determine a price that one user may pay to the other user for the right to use the preferred alternate route. The alternate route negotiation module 256 may determine a price based on assumptions about costs and benefits to either user. Either user may agree to pay the other user the determined price for the right to use the preferred alternate route. The alternate route negotiation module 256 may then facilitate the payment between the parties.

Figure 12:
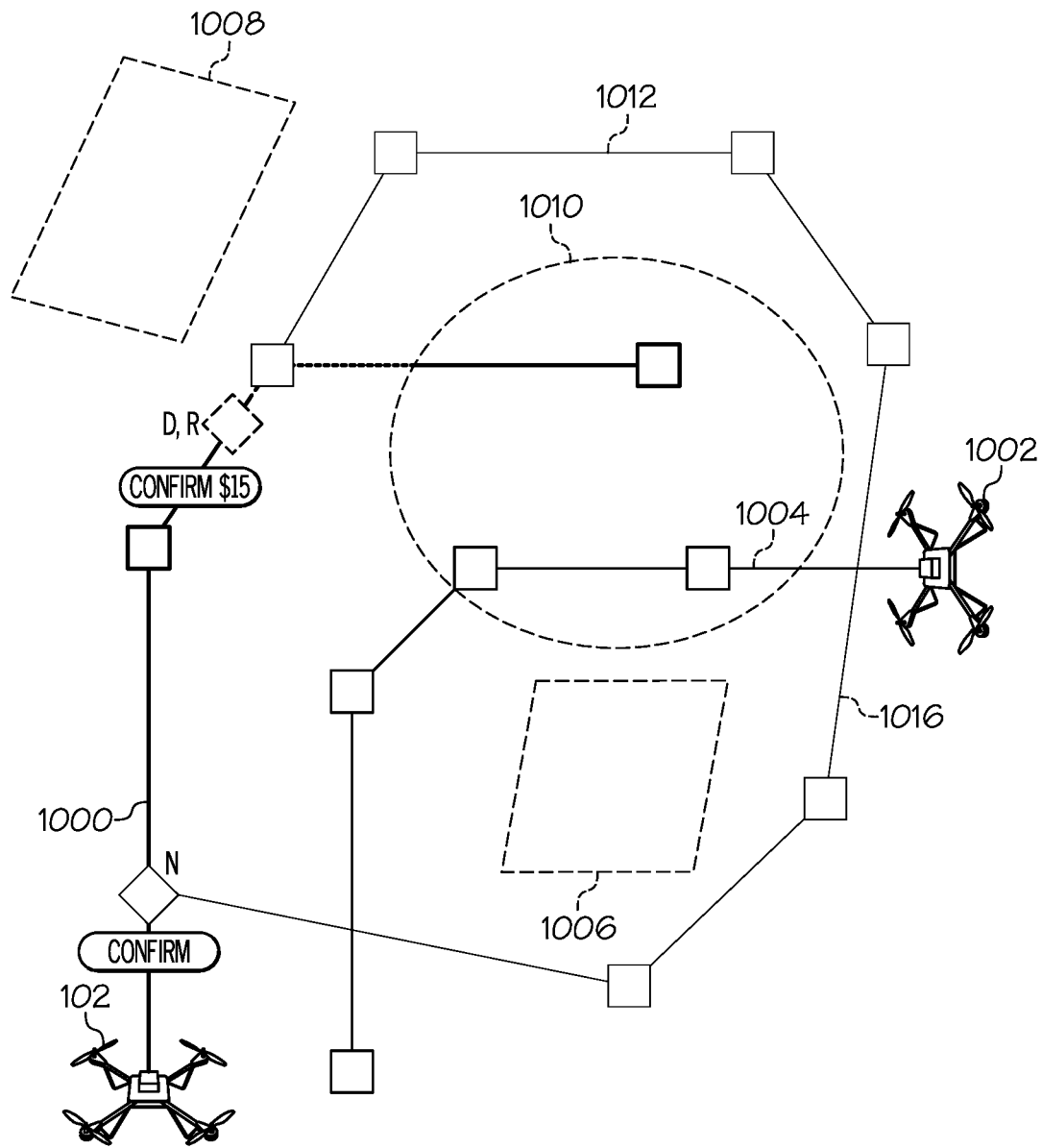
FIG. 12 depicts another example display of a dynamic re-route interface, according to one or more embodiments shown and described herein.

Referring to FIG. 12, an example of such negotiation is shown. The example of FIG. 12 shows the situation previously discussed with reference to FIG. 11. In the example of FIG. 12, two UAS 102 and 1002 are traveling along respective routes 1000 and 1004 when a conflict is determined by the conflict determination module 244. The alternate route determination module 246 determines an alternate route 1012 for the UAS 102 and the alternate route negotiation module 256 determines a negotiated route 1016 for the UAS 102.

In the example of FIG. 12, the alternate route negotiation module 256 also determines a price of $15, which UAS operator 104 may pay to the operator of the UAS 1002 for the right to use route 1012. As shown in FIG. 12, the UTM interface 112 may display the determined price, which the UAS operator may click to confirm. If the UAS operator 104 confirms this price, the alternate route negotiation module 256 may facilitate the payment of $15 from the UAS operator 104 to the operator of the UAS 1002 and the UAS 102 will be granted the right to utilize alternate route 1012. The operator of the UAS 1002 may then select an alternate route, such as a negotiated route determined by the alternate route negotiation module 256. Alternatively, if the UAS operator 104 would prefer to utilize negotiated route 1016, the UAS operator 104 may select that route without making a payment.

The alternate route negotiation module 256 may present a similar offer to the operator of the UAS 1002 such that that operator may agree to pay the determined price to the UAS operator 104 for the right to utilize the preferred alternate route. In some examples, the price offered to both UAS is the same. In other examples, the price offered to each UAS is different and may be based on different costs and benefits associated with each UAS.

It may be desirable for a user to select the alternate route as soon as possible such that the user who is not granted the right to use a preferred alternate route may select a different route. As such, once a UAS passes the starting point of a negotiated route, the price for the preferred alternate route may increase as the UAS approaches the starting point of the preferred route. Accordingly, a user may be encouraged to quickly select the preferred alternate route to avoid paying a higher price to do so.

Figure 3:
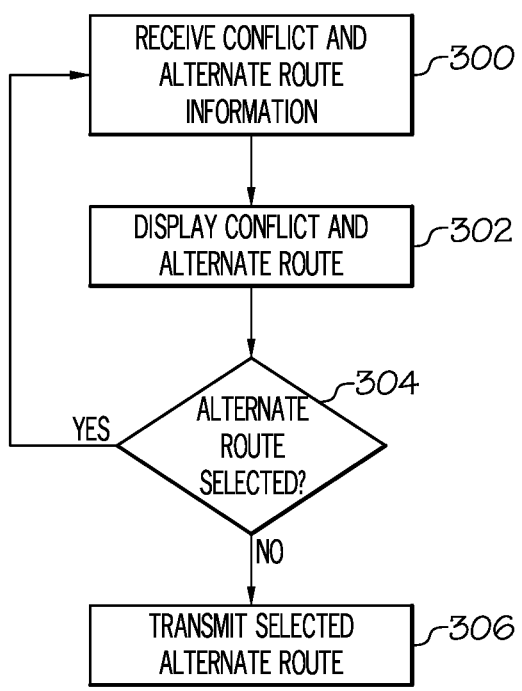
FIG. 3 depicts a flow chart of an illustrative method of performing dynamic re-routing of unmanned aerial vehicles, according to one or more embodiments shown and described herein.

Referring now to FIG. 3, a flow chart is shown of an example method of operating the UTM interface 112 of FIG. 1. At step 300, the UTM interface 112 may receive a notification from the dynamic re-routing unit 110 indicating a conflict with the planned route of the UAS 102. The notification from the dynamic re-routing unit 110 may indicate the nature and location of the conflict. The UTM interface 112 may also receive information about one or more alternate routes to avoid the conflict from the dynamic re-routing unit 110. The information may include starting points and route information for the alternate routes. The UTM interface 112 may also receive information about time horizons during which a decision to choose an alternate route needs to be made. In some examples, the UTM interface 112 may also receive price information regarding negotiated routes to avoid a conflict with another UAS.

At step 302, the UTM interface 112 may display a graphic representation of the information received from the dynamic re-routing unit 110. Specifically, the UTM interface 112 may display the planned route of the UAS 102, the conflict with the planned route of the UAS 102 and the starting points of the received alternate routes. The UTM interface 112 may also indicate information about each alternate route. For example, the UTM interface 112 may display a letter next to each alternate route starting point indicating what the alternate route was optimized for (e.g., 'S' to indicate a route optimized for schedule, 'C' to indicate a route optimized for cost, 'R' to indicate a route optimized for risk, as shown in FIG. 7). If the UTM interface 112 received price information regarding an alternate route (e.g., a price to accept the route), the UTM interface 112 may display the price information for the route, as shown in FIG. 12.

At step 304, the UTM interface 112 determines whether the UAS operator 104 has selected one of the presented alternate routes (e.g., by clicking on an alternate route starting point and then clicking confirm). If the UAS operator 104 has not selected an alternate route (no at step 304), then control returns to step 300. The UTM interface 112 may then receive any updated information about the conflict and/or the alternate routes (e.g., if the conflict has changed or any of the alternate routes are no longer available). If any updated information has been received, the UTM interface 112 may display the updated information at step 302. This may then continue until the UAS operator 104 selects an alternate route.

If the UAS operator 104 has selected an alternate route (yes at step 304), then at step 306, the UTM interface 112 transmits the selected alternate route to the dynamic re-routing unit 110. The UAS operator 104 may then guide the UAS 102 along the selected alternate route.

Figure 4:
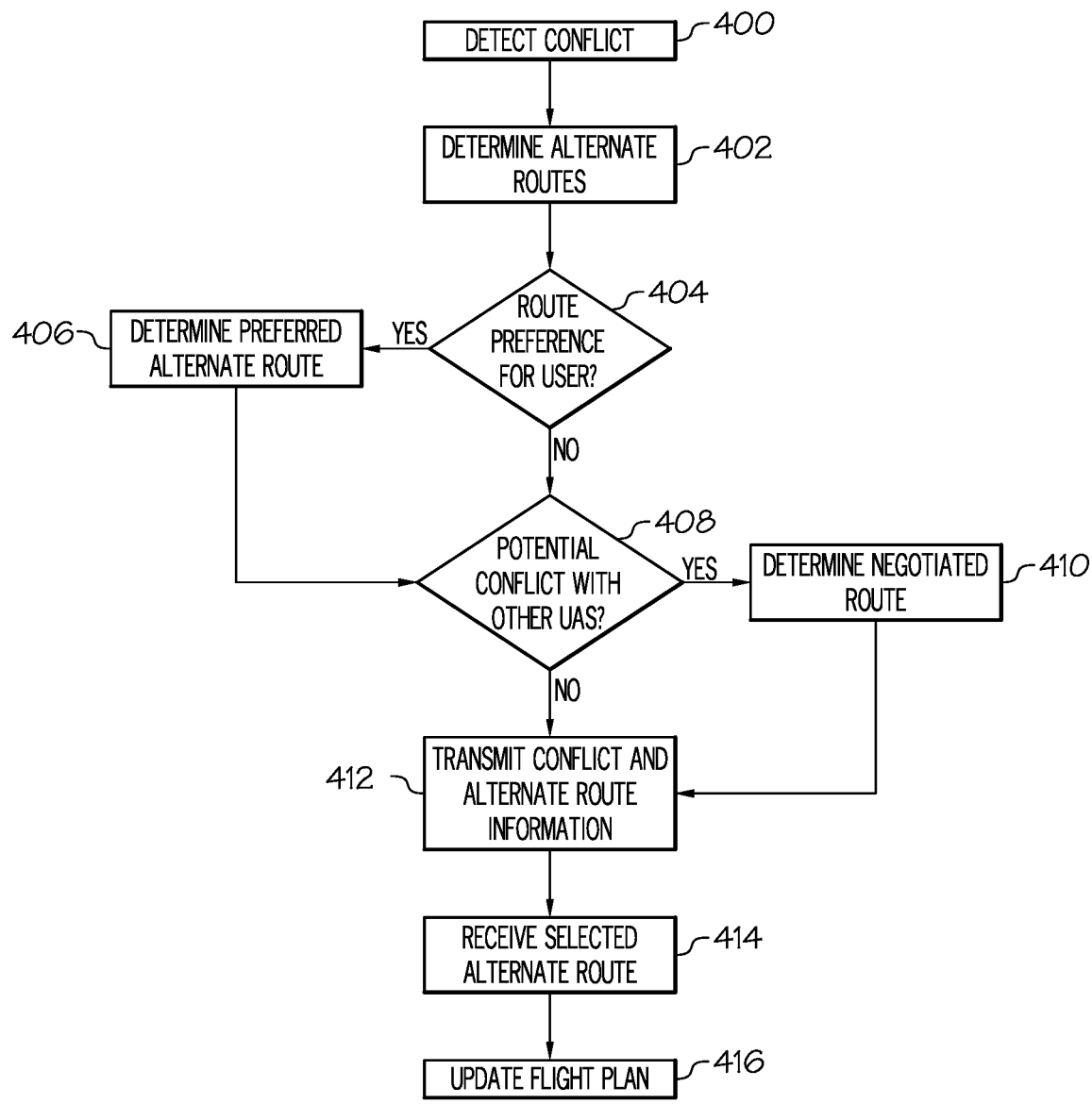
FIG. 4 depicts a flow chart of another illustrative method of performing dynamic re-routing of unmanned aerial vehicles, according to one or more embodiments shown and described herein.

Referring now to FIG. 4, a flow chart is shown of an example method of performing dynamic re-routing that may be implemented by the dynamic re-routing unit 110 of FIG. 1. At step 400, the conflict determination module 244 may identify a conflict. The conflict determination module 244 may identify a conflict based on information received from the UTM network 106. The conflict determination module 244 may determine where and when a conflict will occur with the UAS 102 based on the current route of the UAS 102.

At step 402, the alternate route determination module 246 may determine one or more alternate routes for the UAS 102 to follow to avoid the detected conflict. The alternate route determination module 246 may determine alternate routes that are optimized for certain features. For example, the alternate route determination module 246 may determine alternate routes that are optimized for risk, distance, schedule, or fuel cost, among other things. The alternate route determination module 246 may also ensure that each determined alternate route does not create any secondary conflicts.

At step 404, the route preference determination module 254 may determine whether the UAS operator 104 has a preference for a certain type of alternate route (e.g., the UAS operator 104 may prefer routes optimized for distance, or cost, or risk, or some other criteria). The route preference determination module 254 may make this determination based on previous alternate routes selected by the UAS operator 104. If the route preference determination module 254 determines that the UAS operator has a preference for a certain type of alternate route (yes at step 404), then the route preference determination module 254 determines, at step 406, which of the alternate routes determined by the alternate route determination module 246 matches that preference. If the route preference determination module 254 determines that the UAS operator 104 does not have a preference for a certain type of alternate route (no at step 404), then control passes to step 408.

At step 408, the alternate route negotiation module 256 may determine whether any of the alternate routes determined by the alternate route determination module 246 may conflict with any alternate routes presented to another UAS. If the alternate route negotiation module 256 determines that there may be a conflict with alternate routes presented to another UAS (yes at step 408), then the alternate route negotiation module 256 may determine, at step 410, a negotiated route for the UAS 102 that avoids any conflicts with alternate routes presented to another UAS. In some examples, the alternate route negotiation module 256 may also determine a price that the UAS must pay in order to secure the use of a preferred alternate route rather than the negotiated route. If the alternate route negotiation module 256 determines that there are no conflicts with alternate presented to another UAS (no at step 408), then control passes to step 412.

At step 412, the alternate route transmission module 248 may transmit information about the detected conflict and the determined alternate routes to the UTM interface 112. The information transmitted may include the location of the identified conflict, the locations and starting points of the determined alternate routes, and time horizons during which an alternate route must be selected. If the alternate route negotiation module 256 determined a negotiated route, the alternate route transmission module 248 may also transmit information about the negotiated route, including a determined price for securing a preferred alternate route.

At step 414, the route selection reception module 250 may receive, from the UTM interface 112, information regarding an alternate route selected by the UAS operator 104. Specifically, the information may indicate which alternate route transmitted to the UTM interface 112 was selected by the UAS operator 104. At step 416, the flight plan updating module 252 may transmit information to the UTM network 106 indicating the alternate route selected by the UAS operator 104 such that the UTM network 106 may update the flight plan for the UAS 102.

It should now be understood that the devices, systems, and methods described herein provide a dynamic re-route interface and decision support tool. A conflict with a UAS flight plan may be detected during a UAS flight and one or more alternate routes may be determined to avoid the conflict. The alternate routes may be optimized for different criteria and may be displayed to an operator of the UAS. In some examples, one alternate route may be preferentially displayed to the operator based on previous alternate routes selected by the operator. Time horizons during which an operator may select an alternate route may also be displayed.

In some examples, a situation may arise where two UAS are affected by the same conflict and alternate routes presented to each UAS operator may conflict with each other. When this situation arises, in some examples, the first operator to select the alternate route is granted the right to use the alternate route and the other operator is no longer able to select the conflicting alternate route. In other examples, the operators may be presented a price to be paid to the other operator for the right to use the preferred alternate route. In this example, when one of the operators selects the preferred alternate route, payment of the appropriate price may be facilitated between the operators.

After an operator selects an alternate route, the flight path of the UAS may be updated. The UAS may then use the alternate route to avoid the conflict.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A method comprising detecting, during a flight of an aircraft system, a conflict with a planned route of the aircraft system; determining one or more alternate routes for the aircraft system to avoid the conflict, wherein each of the one or more alternate routes avoid secondary conflicts with active flight operations; transmitting first data to cause first visual information indicating the conflict and second visual information indicating the one or more alternate routes to be displayed to a user; receiving second data indicating one of the one or more alternate routes being selected by the user; and updating the planned route of the aircraft system to include the alternate route selected by the user.

The method of any preceding clause, wherein each of the one or more alternate routes are optimized for a different metric.

The method of any preceding clause, wherein at least one of the one or more alternate routes is optimized to minimize fuel cost.

The method of any preceding clause, wherein at least one of the one or more alternate routes is optimized to minimize distance traveled.

The method of any preceding clause, wherein at least one of the one or more alternate routes is optimized to minimize schedule disruption.

The method of any preceding clause, wherein at least one of the one or more alternate routes is optimized to minimize risk.

The method of any preceding clause, wherein the second visual information comprises an indication of a starting point for each of the one or more alternate routes.

The method of any preceding clause, further comprising upon the user selecting a starting point for one of the alternate routes, displaying the alternate route associated with the selected starting point.

The method of any preceding clause, further comprising receiving the second data indicating the alternate route associated with the selected starting point being selected by the user upon the user confirming the alternate route associated with the selected starting point.

The method of any preceding clause, further comprising determining a type of alternate route preferred by the user based on past alternate routes selected by the user; and causing one of the one or more alternate routes of the type preferred by the user to be preferentially displayed.

The method of any preceding clause, further comprising causing at least one time horizon indicating an amount of time available to the user to select one of the one or more alternate routes to be displayed to the user.

The method of any preceding clause, further comprising determining whether any of the one or more alternate routes conflicts with an alternate route presented to a second user associated with a second aircraft system; and upon determination that at least one of the one or more alternate routes conflicts with an alternate route presented to the second user associated with the second aircraft system, determining a negotiated route that does not conflict with the alternate route presented to the second user and causing the negotiated route to be displayed to the user.

The method of any preceding clause, further comprising upon receiving third data indicating the alternate route presented to the second user being selected by the second user, ceasing to display, to the user, the at least one of the one or more alternate routes that conflicts with the alternate route selected by the second user.

The method of any preceding clause, further comprising causing a price to be displayed to the user indicating an amount of money that is to be paid from the user to the second user for the user to be able to select the at least one of the one or more alternate routes that conflicts with the alternate route presented to the second user.

The method of any preceding clause, further comprising upon receiving an indication that the user has selected the at least one of the one or more alternate routes that conflicts with the alternate route presented to the second user, facilitating payment of the amount of money equal to the displayed price from the user to the second user.

The method of any preceding clause, further comprising causing the price displayed to the user to increase as the aircraft system approaches a starting point of the at least one of the one or more alternate routes that conflicts with the alternate route presented to the second user.

A dynamic re-routing unit comprising one or more processors; one or more memory modules; and machine readable instructions stored in the one or more memory modules that, when executed by the one or more processors, cause the dynamic re-routing unit to detect, during a flight of an aircraft system, a conflict with a planned route of the aircraft system; determine one or more alternate routes for the aircraft system to avoid the conflict, wherein the one or more alternate routes avoid secondary conflicts; transmit first data to cause first visual information indicating the conflict and second visual information indicating the one or more alternate routes to be displayed to a user; receive second data indicating one of the one or more alternate routes being selected by the user; and update the planned route of the aircraft system to include the alternate route selected by the user.

The dynamic re-routing unit of any preceding clause, wherein the machine readable instructions, when executed, cause the dynamic re-routing unit to determine a type of alternate route preferred by the user based on past alternate routes selected by the user; and; cause one of the one or more alternate routes of the type preferred by the user to be preferentially displayed.

The dynamic re-routing unit of any preceding clause, wherein the machine readable instructions, when executed, cause the dynamic re-routing unit to determine whether any of the one or more alternate routes conflicts with an alternate route presented to a second user associated with a second aircraft system; and upon determination that at least one of the one or more alternate routes conflicts with an alternate route presented to the second user associated with the second aircraft system, determine a negotiated route that does not conflict with the alternate route presented to the second user and causing the negotiated route to be displayed to the user.

The dynamic re-routing unit of any preceding clause, wherein the machine readable instructions, when executed, cause the dynamic re-routing unit to, upon receiving third data indicating the alternate route presented to the second user being selected by the second user, cease to display, to the user, the at least one of the one or more alternate routes that conflicts with the alternate route selected by the second user.

What is claimed is:

1. A method comprising:
   detecting, during a flight of a first aircraft system, a conflict with a planned route of the first aircraft system;
   determining one or more alternate routes for the first aircraft system to avoid the conflict, wherein each of the one or more alternate routes avoid secondary conflicts with active flight operations;
   transmitting first data to cause first visual information indicating the conflict and second visual information indicating the one or more alternate routes to be displayed to a first user;
   determining whether any of the one or more alternate routes conflict with a second alternate route presented to a second user associated with a second aircraft system;
   upon determination that at least one of the one or more alternate routes conflict with the second alternate route presented to the second user, negotiating a third alternate route for the first aircraft system that does not conflict with the second alternate route presented to the second user, and causing the third alternate route to be displayed to the first user;
   receiving second data indicating one of the one or more alternate routes being selected by the first user; and
   updating the planned route of the first aircraft system to include the alternate route selected by the first user.

2. The method of claim 1, wherein each of the one or more alternate routes are optimized for a different metric.

3. The method of claim 2, wherein at least one of the one or more alternate routes is optimized to minimize fuel cost.

4. The method of claim 2, wherein at least one of the one or more alternate routes is optimized to minimize distance traveled.

5. The method of claim 2, wherein at least one of the one or more alternate routes is optimized to minimize schedule disruption.

6. The method of claim 2, wherein at least one of the one or more alternate routes is optimized to minimize risk.

7. The method of claim 1, wherein the second visual information comprises an indication of a starting point for each of the one or more alternate routes.

8. The method of claim 7, further comprising upon the first user selecting a starting point for one of the one or more alternate routes, displaying the alternate route associated with the selected starting point.

9. The method of claim 8, further comprising:
   receiving, from the first user, confirmation of selecting the alternate route associated with the selected starting point; and
   receiving the second data indicating the alternate route associated with the selected starting point being selected by the first user upon the first user confirming the alternate route associated with the selected starting point.

10. The method of claim 1, further comprising:
    determining a type of alternate route preferred by the first user based on past alternate routes selected by the first user; and
    causing one of the one or more alternate routes of the type preferred by the first user to be preferentially displayed.

11. The method of claim 1, further comprising:
    causing at least one time horizon indicating an amount of time available to the first user to select one of the one or more alternate routes to be displayed to the first user.

12. The method of claim 1, further comprising:
    upon receiving third data indicating the second alternate route presented to the second user being selected by the second user, ceasing to display, to the first user, the at least one of the one or more alternate routes that conflicts with the second alternate route selected by the second user.

13. The method of claim 1, further comprising:
    causing a price to be displayed to the first user indicating an amount of money that is to be paid from the first user to the second user for the first user to be able to select the at least one of the one or more alternate routes that conflicts with the second alternate route presented to the second user.

14. The method of claim 13, further comprising:
    upon receiving an indication that the first user has selected the at least one of the one or more alternate routes that conflicts with the second alternate route presented to the second user, facilitating payment of the amount of money equal to the displayed price from the first user to the second user.

15. The method of claim 13, further comprising:
    causing the price displayed to the first user to increase as the first aircraft system approaches a starting point of the at least one of the one or more alternate routes that conflicts with the second alternate route presented to the second user.

16. A dynamic re-routing unit comprising:
    one or more processors;
    one or more memory modules; and
    machine readable instructions stored in the one or more memory modules that, when executed by the one or more processors, cause the dynamic re-routing unit to:
    detect, during a flight of a first aircraft system, a conflict with a planned route of the first aircraft system;
    determine one or more alternate routes for the first aircraft system to avoid the conflict, wherein the one or more alternate routes avoid secondary conflicts;

transmit first data to cause first visual information indicating the conflict and second visual information indicating the one or more alternate routes to be displayed to a first user;

determine whether any of the one or more alternate routes conflict with a second alternate route presented to a second user associated with a second aircraft system;

upon determination that at least one of the one or more alternate routes conflict with the second alternate route presented to the second user, negotiate a third alternate route for the first aircraft system that does not conflict with the second alternate route presented to the second user, and cause the third alternate route to be displayed to the first user;

receive second data indicating one of the one or more alternate routes being selected by the first user; and update the planned route of the first aircraft system to include the alternate route selected by the first user.

17. The dynamic re-routing unit of claim 16, wherein the machine readable instructions, when executed, cause the dynamic re-routing unit to:

determine a type of alternate route preferred by the first user based on past alternate routes selected by the first user; and cause one of the one or more alternate routes of the type preferred by the first user to be preferentially displayed.

18. The dynamic re-routing unit of claim 17, wherein the machine readable instructions, when executed, cause the dynamic re-routing unit to:

upon receiving third data indicating the second alternate route presented to the second user being selected by the second user, cease to display, to the first user, the at least one of the one or more alternate routes that conflicts with the second alternate route selected by the second user.

19. The method of claim 1, further comprising:

determining a first starting point for each of the one or more alternate routes;

causing the first starting point for each of the one or more alternate routes to be displayed to the first user; and after the first aircraft system passes the starting point for one of the one or more alternate routes:

determining a new starting point for the alternate route for which the first aircraft system has passed the starting point; and causing the new starting point to be displayed to the first user.

* * * * *